United States Patent [19]

Bonerb

[11] Patent Number: 4,678,389
[45] Date of Patent: * Jul. 7, 1987

[54] FREIGHT VEHICLE WITH A CONVERTIBLE CARGO SPACE

[75] Inventor: Timothy C. Bonerb, Orchard Park, N.Y.

[73] Assignee: Vincent C. Bonerb, Boston, N.Y.

[*] Notice: The portion of the term of this patent subsequent to Aug. 13, 2002 has been disclaimed.

[21] Appl. No.: 673,770

[22] Filed: Nov. 21, 1984

Related U.S. Application Data

[63] Continuation-in-part of Ser. No. 480,499, Mar. 30, 1983, Pat. No. 4,534,596.

[51] Int. Cl.⁴ .................. B60P 1/56; B65G 65/30
[52] U.S. Cl. ..................... 414/267; 105/359; 220/1.5; 220/22; 220/85 B; 222/105; 222/183; 296/10; 296/24 R; 414/539
[58] Field of Search .............. 414/539, 267, 304, 393; 105/243, 355, 358, 359, 363, 423; 220/1.5, 22, 85 B; 298/1 B; 222/105, 183, 610; 296/10, 24 R

[56] References Cited

U.S. PATENT DOCUMENTS

| | | | |
|---|---|---|---|
| 2,712,797 | 7/1955 | Woehrle et al. | 105/367 |
| 3,139,998 | 7/1964 | Seaman | 414/393 X |
| 3,514,151 | 5/1970 | Hacker | 220/22 X |
| 3,583,330 | 6/1971 | Freud et al. | 105/239 |
| 3,756,469 | 9/1973 | Clark et al. | 222/105 |
| 3,918,604 | 11/1975 | Kersten | 220/22 |
| 4,092,051 | 5/1978 | D'Orazio | 298/24 |
| 4,155,469 | 5/1979 | Cole | 414/524 |
| 4,241,947 | 12/1980 | Schroder | 296/10 |
| 4,421,250 | 12/1983 | Bonerb et al. | 222/95 |
| 4,497,259 | 2/1985 | Titterton | 220/85 B X |
| 4,534,596 | 8/1985 | Bonerb | 105/243 X |
| 4,541,765 | 9/1985 | Moore | 414/267 |
| 4,574,984 | 3/1986 | Bonerb | 222/64 X |

FOREIGN PATENT DOCUMENTS

| | | | |
|---|---|---|---|
| 1100852 | 9/1955 | France | 220/85 B |
| 1199775 | 12/1959 | France | |
| 115821 | 9/1979 | Japan | |
| 03839 | 11/1982 | PCT Int'l Appl. | |
| 1144162 | 3/1969 | United Kingdom | |

OTHER PUBLICATIONS

Converta-Vans Brochure.

Primary Examiner—Robert J. Spar
Assistant Examiner—Stuart J. Millman
Attorney, Agent, or Firm—Bernard, Rothwell & Brown

[57] ABSTRACT

A freight vehicle has a cargo space convertible from that suitable for handling piece goods to that suitable for bulk material. A conventional cargo space for piece goods has openings for filling and discharging bulk material. A double-walled inflatable bag having its bottom attached to a rigid support platform is positioned in erected condition to handle bulk material and is movable to a stored position near the roof of the cargo space to allow handling of piece goods.

17 Claims, 37 Drawing Figures

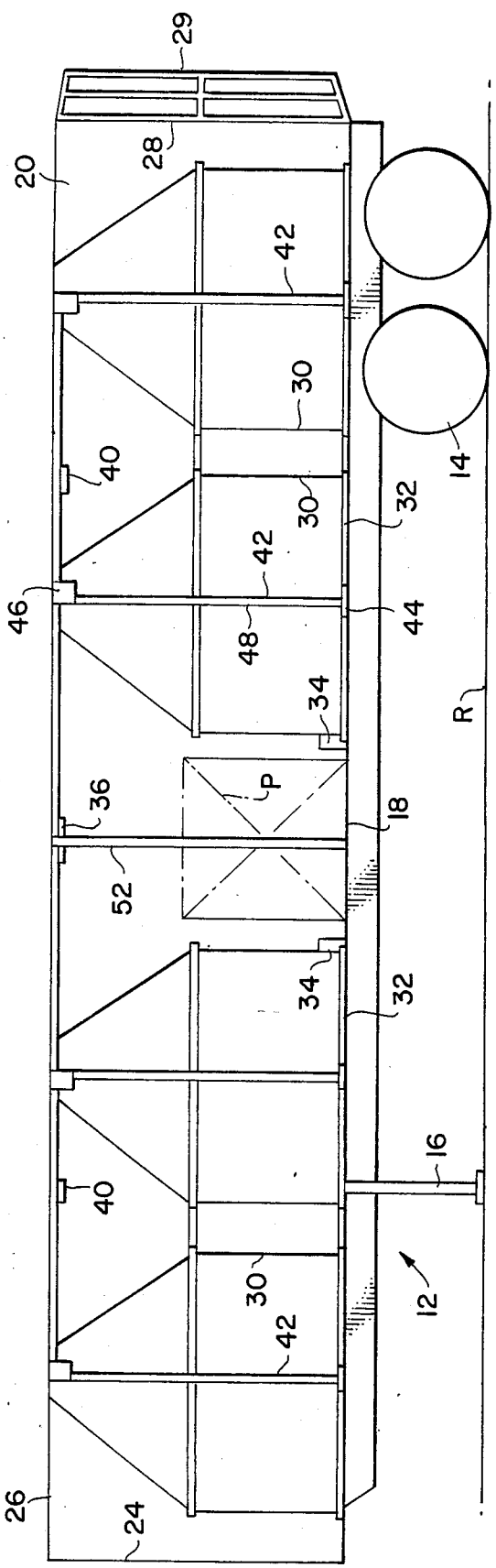

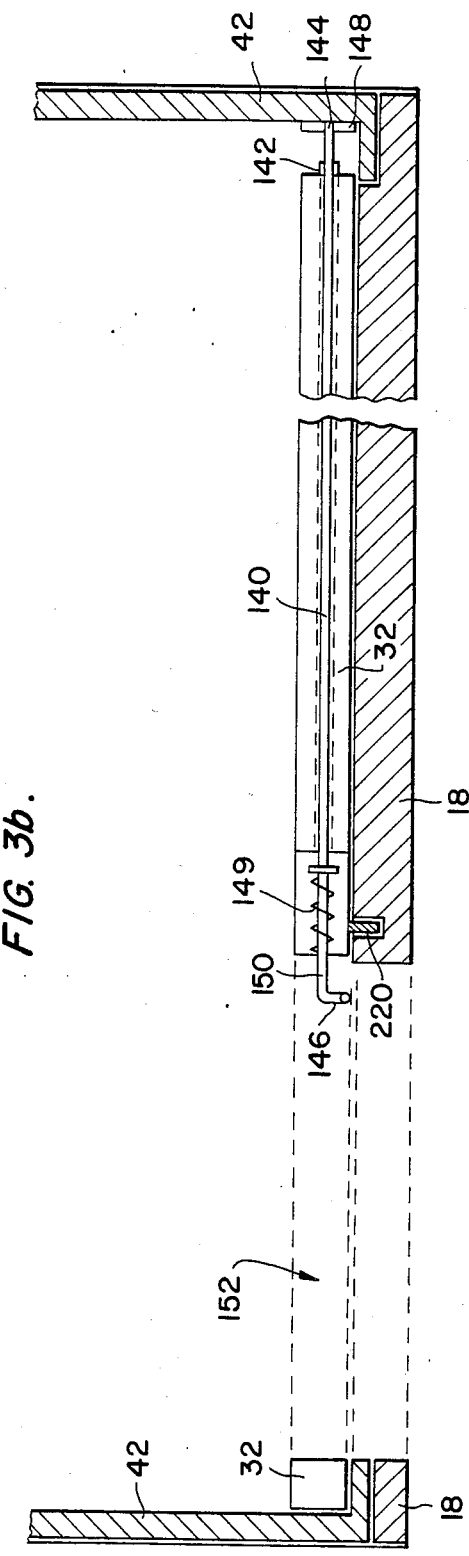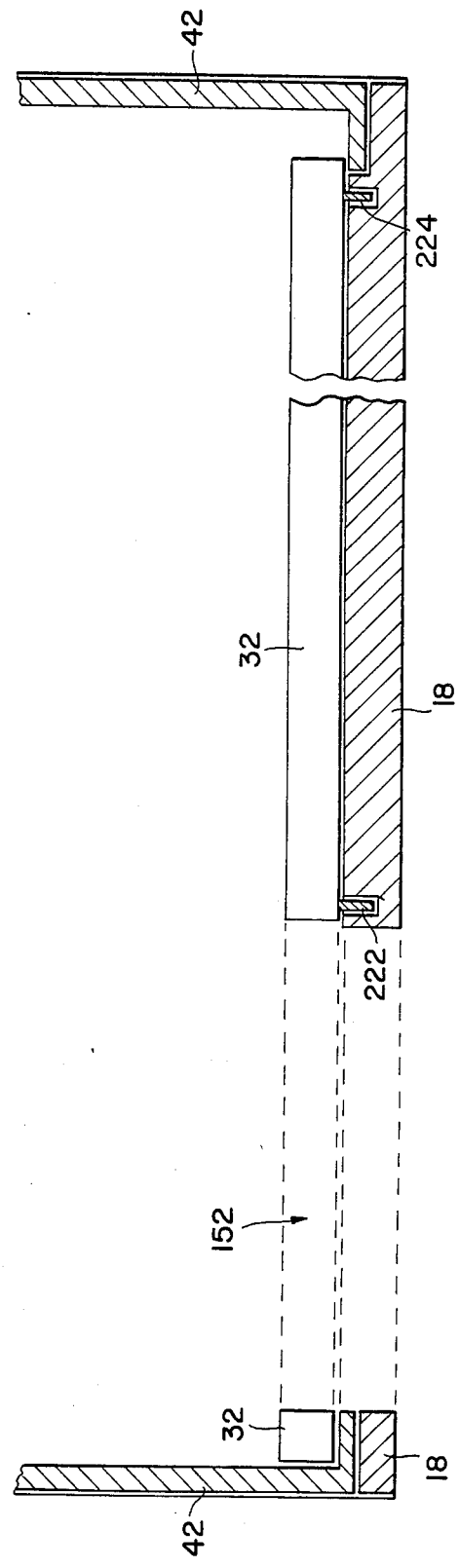

FIG. 20.
FIG. 21.
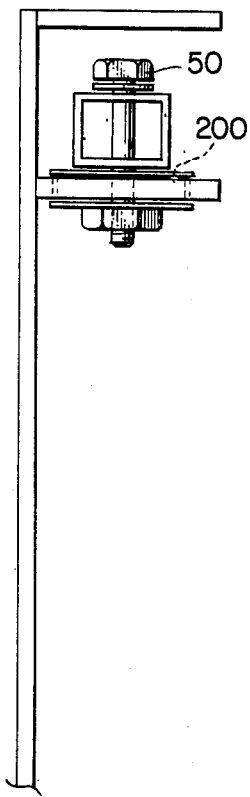
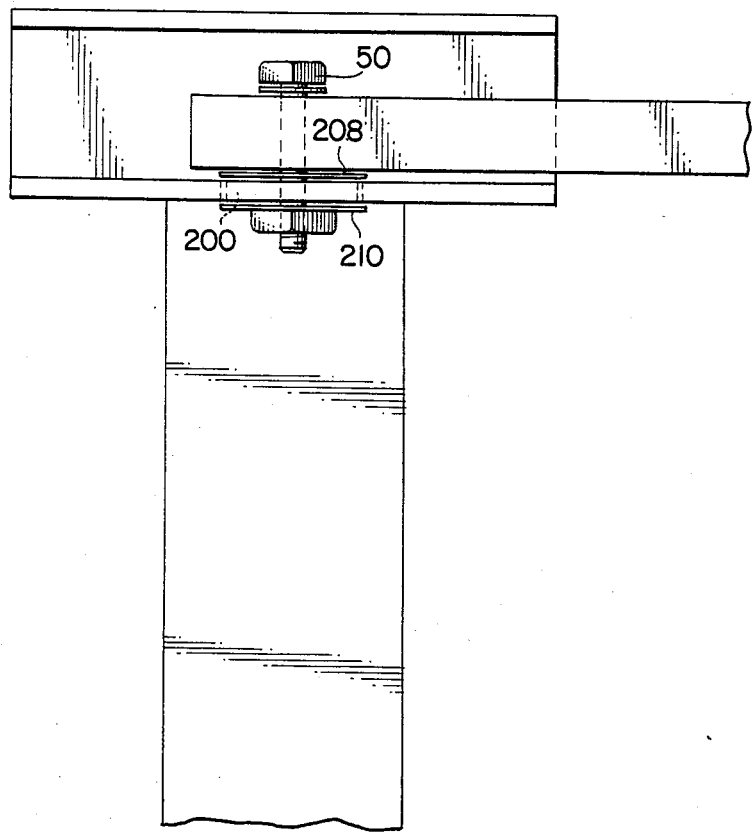
FIG. 22.
FIG. 23.
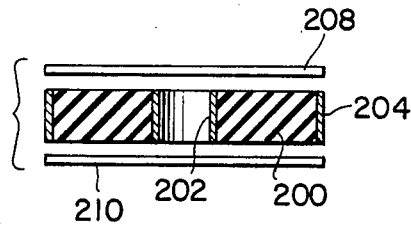
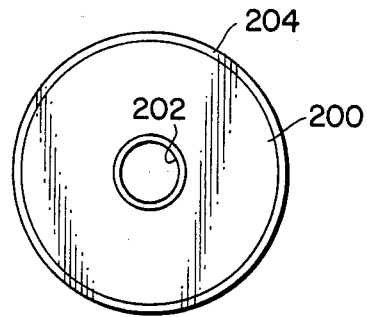

FREIGHT VEHICLE WITH A CONVERTIBLE CARGO SPACE

CROSS REFERENCE TO RELATED APPLICATION

This application is a continuation-in-part of copending prior application Ser. No. 480,499, filed Mar. 30, 1983 now U.S. Pat. No. 4,534,596.

BACKGROUND OF THE INVENTION

1. Field of the Invention

This invention relates to improvements in freight vehicles having a cargo space convertible for handling piece goods or bulk granular, powder or flake material.

2. Prior Art

The desirability of having the cargo space of a freight vehicle which would be suitable for handling either piece goods or bulk goods is well known. The obvious advantage is that the same cargo space on the same vehicle could handle either of these two significantly different types of loads. Convertibility of cargo space provides extreme flexibility and prevents empty runs of the vehicle. For example, a truck-trailer could handle piece goods such as palletized bags of sugar on one run and on a return run could handle bulk goods such as sugar in the bulk going back to the packaging factory; a plastics company could send finished goods in standard cargo space and return with a bulk load of resin; a brewer could send kegs or cases of beer and bring back malt or grains in the same vehicle, and there are many other uses of a similar nature.

The term "freight vehicle" encompasses any vehicle which could contain freight or cargo, including without limitation trucks, truck-trailers, railway cars, and movable containers such as are transported by ship, aircraft, truck and rail, as well as intermodal vehicles. "Piece goods" includes any individual item such as packaged or palletized goods commonly handled as individual pieces. "Bulk goods" includes any of the known and commonly shipped bulk granular or powder material.

Various convertible freight vehicles are already known; however, the known types all have certain disadvantages. For example, a van sold by Converta-Vans, Inc. of Wescoville, Pa., provides a cargo space with four separate convertible bulk hoppers utilizing gravity discharge from the hoppers and hinged floor sections above the hoppers. These hoppers make the van expensive and heavy, and the weight contributes to the energy expenditure of hauling. Moreover, general cargo vans are not easily converted to the Converta-Van configuration due to the necessity of providing the hoppers.

There also exists patented prior art on convertible freight vehicles, including U.S. Pat. No. 4,092,051, granted May 30, 1978. This patent similarly uses hoppers at the bottom of the bulk cargo space to assist in providing complete gravity discharge. The disadvantages of this hopper-containing vehicle are substantially the same as those of the Converta-Van product.

In U.S. Pat. No. 4,241,947, granted Dec. 30, 1980, there is shown a collapsible bulk storage member with slatted sidewalls, but it also has a fixed hopper-shaped bottom discharge. It is also subject to the same limitations as are present in the Converta-Van.

Thus, there is a need in the art to provide a simple, lightweight and inexpensive convertible cargo space in a freight vehicle which does not use hopper bottoms and which can be applied to conventional and existing freight vehicles with a minimum of modifications. This invention satisfies such need.

It is also known in the art to provide stationary bins for discharging free-flowing granular material which do not use hopper bottoms. See, e.g., British Patent No. 1,144,162. However, such stationary units are not suitable or practical for converting piece goods cargo space to handle bulk goods.

SUMMARY OF THE INVENTION

This invention provides improvements in a freight vehicle having a cargo space convertible for handling either piece goods or bulk granular, powder or flake material without the use of hoppers and with only minor modifications which add little weight to existing and known cargo space constructions now used for piece goods. More particularly, a cargo space for piece goods is provided with openings for filling and discharging bulk goods. A flexible, inflatable, double-walled generally cup-shaped bag with connections to the fill opening and the discharge opening is provided for holding the bulk material. The material, after being emptied to the extent allowed by gravity is then further emptied by inflation of the bag to nudge bulk material towards the discharge opening (pneumatically assisted gravity discharge). The bag rests on a movable bag support platform member which, when the cargo space is used for piece goods, is raised and stored with the bag above it at a position just under the roof of the cargo space.

BRIEF DESCRIPTION OF THE DRAWINGS

FIG. 1 is the side elevation view with the sidewall removed to view the inside of the convertible cargo space showing this invention in the form for hauling bulk cargo.

FIG. 2 is a side elevation view of a modification of one of the bulk carrier bags showing a side discharge arrangement.

FIG. 3b is a sectional elevation view of modified means for preventing movement of a support platform in the bulk position.

FIG. 3c is a sectional elevation view of modified means for preventing movement of a support platform in the bulk position.

FIG. 20 is a schematic cross-sectional view of a modification of a side-support assembly according to the invention showing shock-absorbing connecting means.

FIG. 21 is a front elevation view, partially schematic, of the support assembly shown in FIG. 20.

FIG. 22 is a detailed cross-sectional view of the shock-absorbing means shown in FIG. 20.

FIG. 23 is an elevation view of the shock-absorbing means shown in FIG. 22.

DETAILED DESCRIPTION OF THE PREFERRED EMBODIMENTS

Figure 3A:
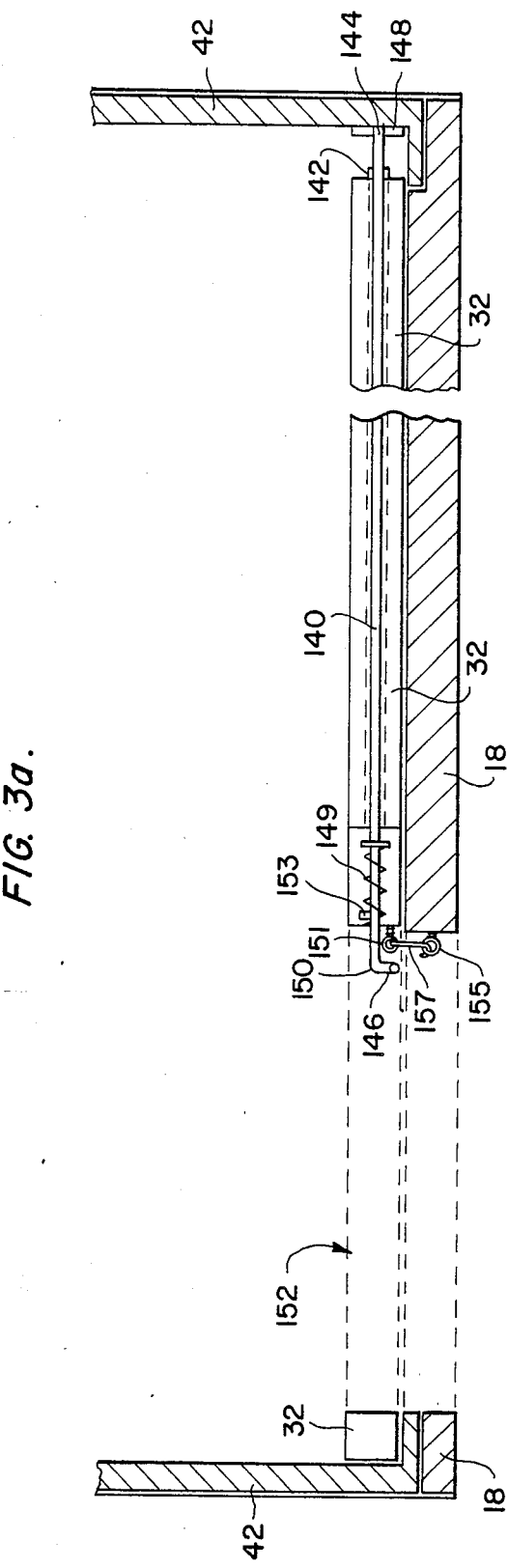
FIG. 3a is a sectional elevation view along line 3a–3a of FIG. 4 with the center portion broken away.

As shown in FIG. 1, a freight vehicle is in the form of a conventional semi-trailer, although it could be any other cargo-containing space. In the form shown in FIG. 1, the trailer has wheels 14 for movement over a roadway R and a conventional support 16.

The cargo space of the trailer 12 has a conventional flat floor 18, sidewalls 20 and 22, a front-end wall 24, top wall 26, and a rear wall 28 which may conveniently contain access doors 29 as is conventional in such semi-trailers. The trailer thus described is a typical semi-trailer of the type commonly used to haul piece goods cargo with trucks. For converting the trailer cargo space for use in hauling either piece goods or bulk cargo, openings are provided for filling and discharge of bulk material.

The cargo space of trailer 12 in the present invention, can selectively haul bulk cargo in bulk cargo bags 30. As shown in FIG. 1, there are four identical generally cup-shaped bulk cargo bags which are positioned in pairs on rigid platforms or bag bottom supports 32, the platforms 32 being raisable from the position for hauling bulk cargo as shown in FIG. 1 (bulk mode) to a storage position within several inches of top wall 26 so that the cargo space may be used for hauling piece goods (piece goods mode) as described in commonly owned application Ser. No. 480,499, filed Mar. 20, 1983, now U.S. Pat. No. 4,534,596.

Figure 4:
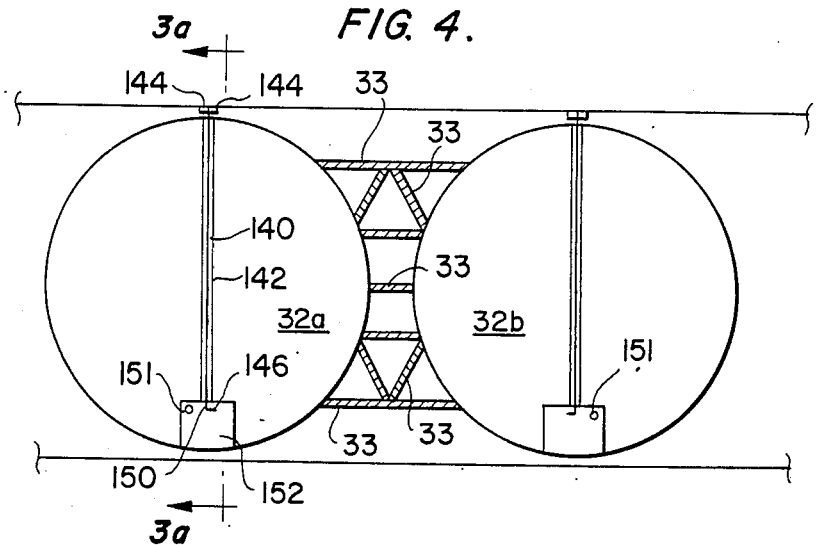
FIG. 4 is a top plan view of a modification of a rigid bag support platform for side discharge of bulk material.
Figure 12:
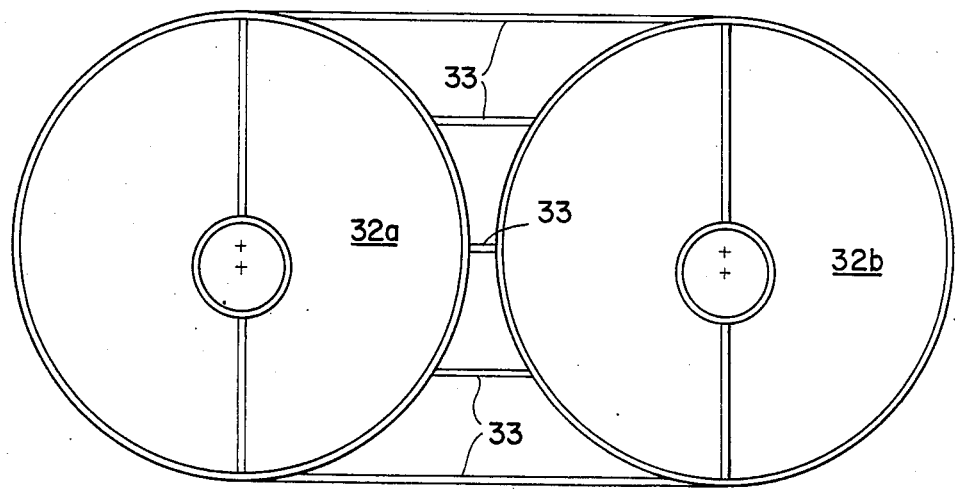
FIG. 12 is a top plan view of a modification of a bag bottom and support platform for a pair of offset central discharge bags.
Figure 13:
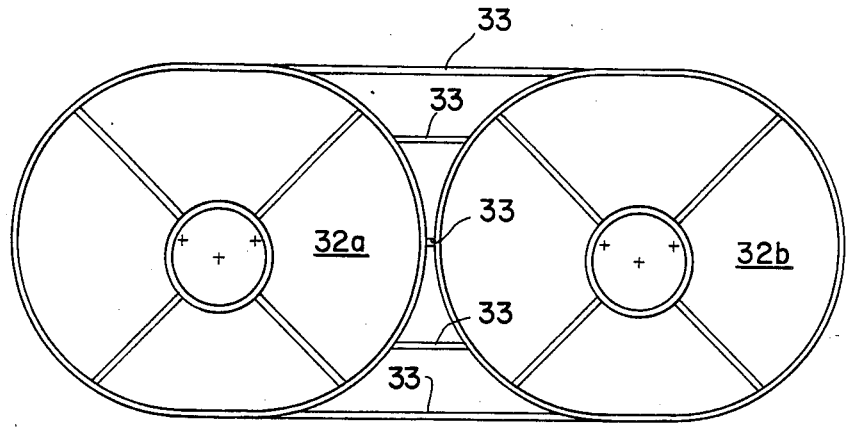
FIG. 13 is a top plan view of a modification of a bag bottom and support platform for a pair of oval bags with offset central discharge.

Obviously, more or less than four bags may be used as desired or required by the cargo space available. The platforms also may be of a different configuration so long as they underlie and support the bag bottom. For example, FIGS. 4, 12 and 13 illustrate pairs of bottom bag supports 32a and 32b interconnected by rigid support members 33 to form suitable platforms for pairs of bags. The platforms shown in FIGS. 4 and 12 are suitable for cylindrical bags, whereas the platform shown in FIG. 13 is suitable for a pair of oval bags. However, the bags and their support platforms may be of any suitable shape, e.g., angular such as octagonal, square or rectangular.

Figure 17:
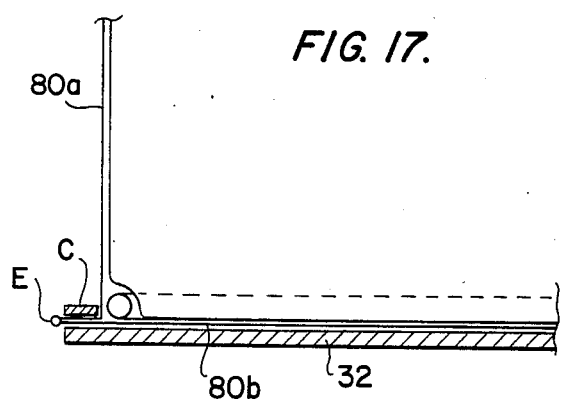
FIG. 17 is a schematic cross-sectional view, with portions broken away, of one means of attaching a bag to a platform according to the invention.

The bags may be connected to corresponding platforms using any suitable means. FIG. 17 shows one such means wherein the outer membrane 80 of the bag includes an outer sidewall 80a and an outer membrane floor member 80b which are joined at roped edge E. A clamping ring C passes circumferentially around the outside of the bag but inside the roped edge E to clamp the outer membrane 80 to platform 32. Any suitable means such as bolts or rivets may be used to secure clamping ring C to platform 32.

Each bag 30 is preferably provided with an individual fill opening in the vehicle, which is preferably located in the roof of the vehicle. Alternatively, fill openings may be provided in a sidewall of the vehicle, with suitable means for delivering the bulk material to a bag. Each bag is also provided with a discharge opening in the vehicle, preferably located in the floor of the vehicle, although discharge openings may be provided in the side of the vehicle with side discharge bags.

Each of the bulk cargo bags 30 is a double-walled cup-shaped bag and discharges its cargo first to the extent allowed by gravity and then by pneumatically assisted gravity discharge as disclosed in U.S. Pat. No. 4,421,250, granted Dec. 20, 1983. In order to provide the air for inflating the bags, each platform may carry a conventional blower 34 with suitable connections (not shown) to inflate and deflate the space between the walls of the bag. Alternatively, the blower may be portable and selectively connectable to the bags to accomplish the inflation. Also, the bags may have lines connected to fittings to supply air or vacuum to the bags in the trailer from an unloading station.

Figure 11:
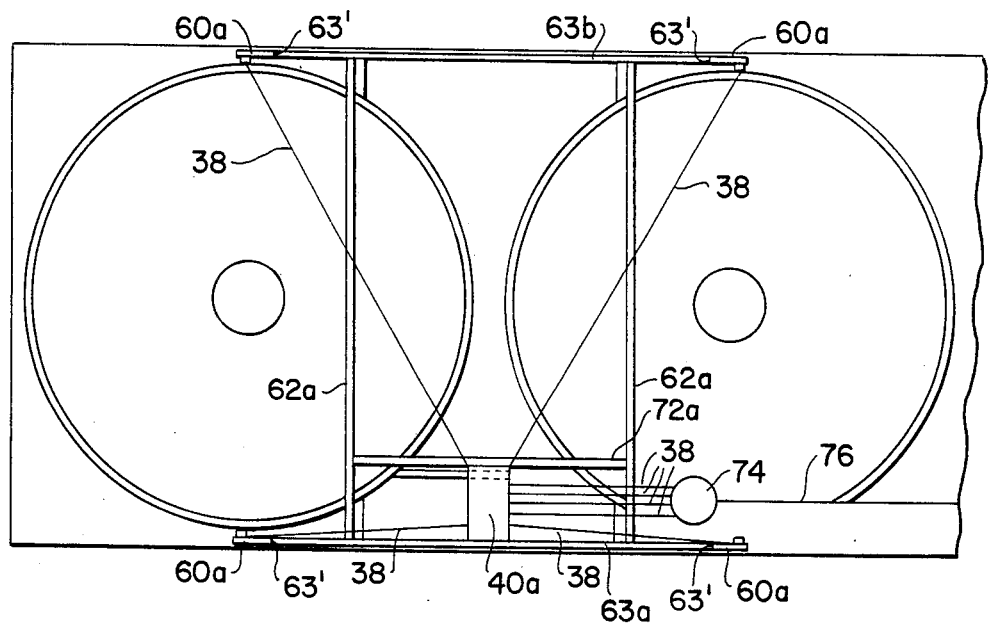
FIG. 11 is a top plan view showing a horizontal bag roof support and a pair of bag rings for a pair of bags according to the invention.
Figure 26:
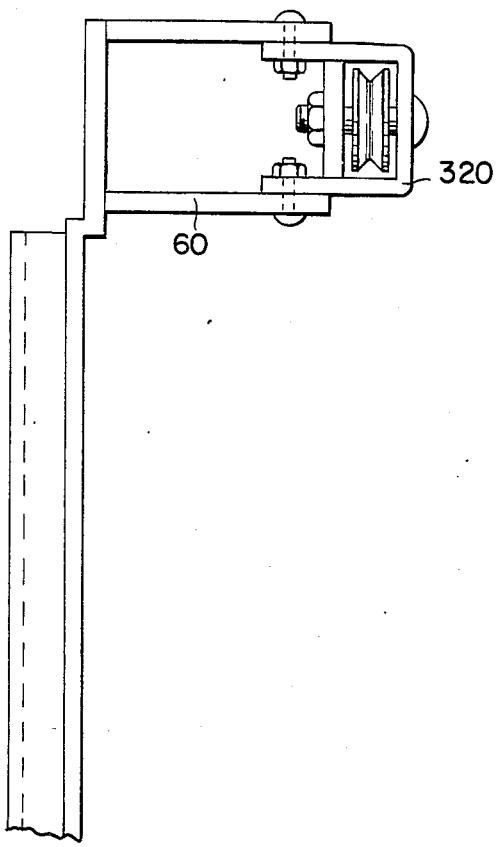
FIG. 26 is a detailed side elevational view of the upper portion of the side support shown in FIG. 25, with a pulley support and platform pulley mounted thereon.

For raising the platforms 32 and hence moving the bags from bulk storage position to the stowage position, any suitable lifting mechanism may be utilized. As shown in FIGS. 1, 11 and 26, a winch 36 operates to pull a plurality of cables 38. These cables extend from four points on the platform vertically upward through pulley support 320 mounted in bracket 60, and then across the top of the storage space to a pulley box 40a.

When a power winch 36 is used, it is desirable from a safety standpoint to employ a warning buzzer and time delay mechanism to warn persons other than the operator that the bags are about to be lowered or raised.

Positioned adjacent the sidewalls 20 and 22 of the freight vehicle are support rails 42 which extend from a footing 44, which may be mounted on the floor but is preferably recessed therein, to the ceiling of the cargo space adjacent the sidewalls. See FIGS. 1, 3a, 3b, 3c, 14, 24 and 25. Support rails 42 may include a top support plate 46, and a rail support plate 48 extending between footing 44 and top support bracket 46.

Figure 14:
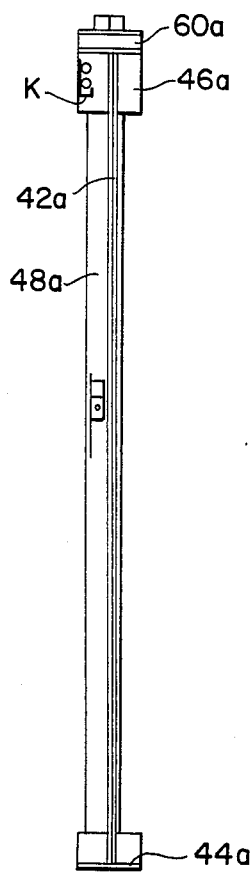
FIG. 14 is a side elevation view of a modification of a side support assembly according to the invention.
Figure 15:
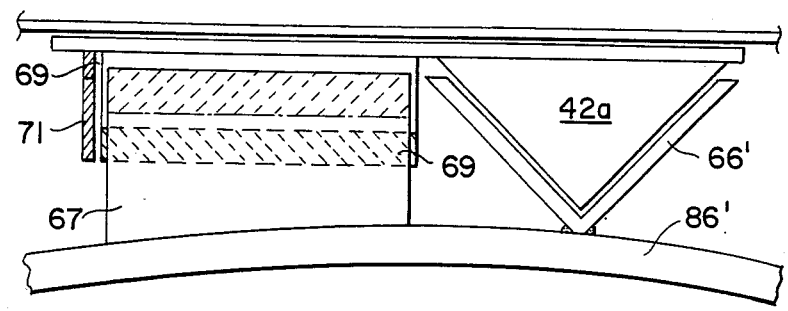
FIG. 15 is a schematic cross-sectional view, from above with portions broken away, of the side support assembly of FIG. 14 with bag ring connectors.
Figure 16:
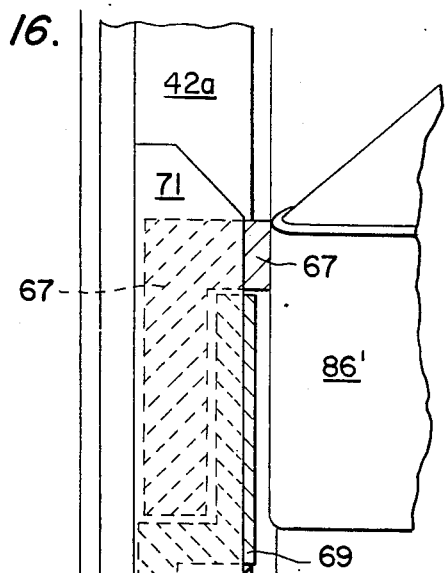
FIG. 16 is a schematic cross-sectional view, from the side with portions broken away, of the side support assembly of FIG. 14 with bag ring connectors.

Support rails 42a, suitable for use with freight vehicles having single-layer sidewalls, are shown in FIGS. 14, 15 and 16. According to this embodiment, each side support includes rail support plate 48a extending between top support plate 46a and footing 44a adjacent a sidewall of the freight vehicle. A top support bracket 60a is mounted at the top of top support plate 46a, and support rail 42a extends between bracket 60a and footing 44a along rail support plate 48a.

Figure 19:
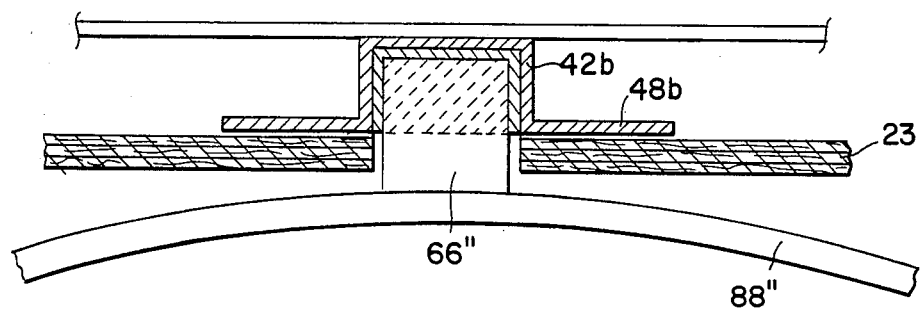
FIG. 19 is a schematic cross-sectional view of a modification of a side-support assembly according to the invention.
Figure 25:
FIG. 25 is a side elevation view of the side support shown in FIG. 24.
Figure 24:
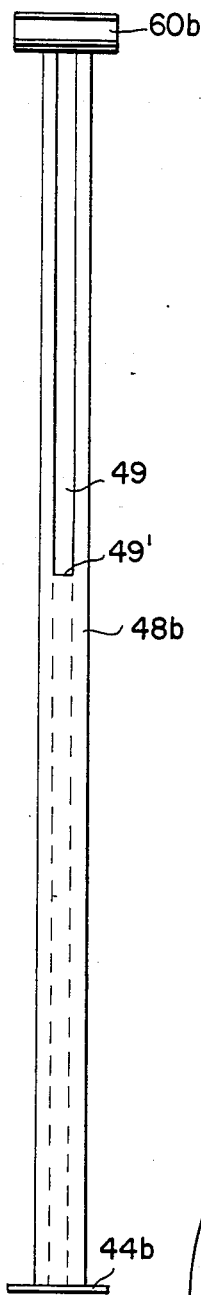
FIG. 24 is a front elevation view of a side support according to one embodiment.

Support rails 42b, suitable for use with freight vehicles having an outer vehicle sidewall and an inner cargo space sidewall, are shown in FIGS. 19, 24 and 25. According to this embodiment, each side support includes rail support plate 48b extending between top support bracket 60b and footing 44b between the outer sidewall 20 or 22 and inner cargo space sidewall 23. Inner cargo space sidewall 23 is generally constructed of plywood, as shown in FIG. 19.

Alternatively, the support rails may be mounted on the outside of the vehicle sidewalls to provide unobstructed cargo space.

The bag support assembly includes a horizontal support structure located at the ceiling of trailer 12. See FIGS. 1 and 11. The horizontal support structure includes transverse cross members 62a, support rail 72a and longitudinal support members 63a and 63b. Support rail 72a and longitudinal support member 63a provide support for pulley box 40a.

Ends 63' of longitudinal support members 63 are supported by side support rails 42 and connected therewith by means of corresponding brackets 60 and bolts 50. See FIGS. 20, 21, 22 and 23. Because trailers are generally designed so that they can twist to a certain degree, the connection between brackets 60 and corresponding longitudinal support members 63 is preferably a flexible connection in order to avoid damage to the trailer during twisting motion. The flexible connecting means include a circular core member 200 of rubber or other compressible material. The inner and outer circumferential surfaces of the core member are faced with metal bushings 202 and 204, respectively. Outer bushing 204 is sized to complementarily fit within and mate with corresponding openings in lower extension plate 206 of bracket 60. According to this embodiment, an end 63' of a support member 63 is attached to a corresponding bracket 60 by means of a bolt 50 extending through a complementary opening in end 63', flat washer 208, complementary inner bushing 202, and flat washer 210. A nut 212 secures bolt 50 in place, thereby providing a non-rigid connection between support member 63 and bracket 60 which permits flexing of the bag support structure. It is also preferable to use bolts 50 having a low shear point to connect members 63 to brackets 60 so that if the trailer incurs a quick or violent twist, the bolts will shear and avoid damaging the trailer.

Means are provided for guiding bag retainer rings 86 while the bags are being lowered or raised, and for securing the bag retainer rings 86 to the trailer sidewalls 20 and 22 during the bulk mode (down position).

FIGS. 14, 15 and 16 show means for guiding bag rings 86' and for securing the rings in position during the bulk-handling mode which are suitable for use with a freight vehicle having single-layer sidewalls. According to this embodiment, a V-shaped bag ring guide 66' is attached to each bag ring 86' at positions corresponding to the locations of wedge-shaped support rails 42a. The V-shaped guides 66' maintain alignment of the bag rings 86' when they are raised and lowered relative to the support rails 42a. An inverted L-shaped bag ring tab 67 is attached to each bag ring 86' adjacent each V-shaped bag ring guide 66'. A keeper 69 is attached to the trailer sidewall adjacent each support rail 42a in position to catch a corresponding bag ring tab 67 as the bags are lowered. Means can be provided for adjusting the vertical position of keeper 69. In the bulk-handling mode, bag ring tabs 67 rest in corresponding keepers 69, maintaining the vertical positions and level of the bag rings. A flange 71 is attached to the trailer sidewall adjacent each keeper 69 to prevent a bag ring tab 67 from passing out of the corresponding keeper in one horizontal direction, and the adjacent V-shaped bag ring guide 66' in conjunction with the corresponding guide rail 42a prevent the bag ring tab from passing out of the keeper in the other horizontal direction. The bag rings are thus secured in position during the bulk-handling mode.

FIGS. 19, 24 and 25 show means for guiding bag rings 86'' and for securing the rings in position during the bulk-handling mode which are suitable for use with a freight vehicle having an outer vehicle sidewall and an inner cargo space sidewall. According to this embodiment, the upper portion of rail support plate 48b has a slot 49 passing therethrough, permitting access to the inner surface of support rail 42b. The slot 49 extends from top support bracket 60b to a position on rail support plate 48b corresponding to the height of the bag support ring 86'' in the down position. A rectangular bag ring guide 66'' is attached to each bag ring 86'', at positions corresponding to the locations of U-shaped support rails 42b. Rectangular ring guides 66'' complementarily fit within support rails 42b through slots 49, thereby maintaining alignment of the bag rings 86'' when they are raised and lowered relative to the support rails 42b. The lower boundary 49' of slot 49 is located at the desired vertical position of the bag rings 86'' in the down position, thereby maintaining the vertical positions and level of the bag rings by supporting ring guide 66''. Support rails 42b and slots 49 function as keepers for ring guides 66'', thereby preventing horizontal movement of bag rings 86''.

When the bag support framework (including support rails 42) is manufactured of mild steel, and attached to trailer sidewalls of aluminum, it is highly desirable to prevent contact between the mild steel support components of the framework and the aluminum components of the trailer in order to avoid corrosion. In practice, a protective barrier, such as PVC tape, is advantageously applied between the mild steel framework and the aluminum components of the trailer at points of contact, and stainless steel fasteners (e.g., bolts, rivets and the like) are used.

Figure 9:
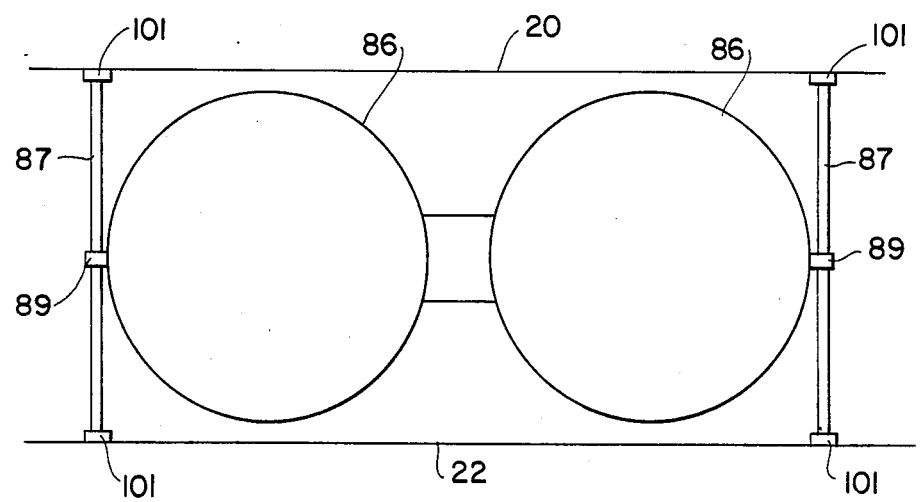
FIG. 9 is a top plan view of a pair of bag retainer rings and supports according to one embodiment of the invention.

Other suitable means for securing a bag ring 86 in position during the bulk handling mode can also be used. One such means includes hooks (not shown) connected to bag retainer ring 86 at positions adjacent to trailer sidewalls 20 and 22, the hooks being selectively engageable with complementary eyelets (not shown) which are attached to trailer sidewalls 20 and 22 or the support and guide rails 42. Alternatively, a bag ring 86 may be held in position and supported by a pole 87 extending transversely between trailer sidewalls 20 and 22. A pole 87 is connected to a bag ring 86 by bracket 89, each end of the pole being connected to a trailer sidewall by side brackets 101. See FIG. 9.

Additional support may be provided for the bag rings 86 while in the bulk-handling mode (down position) to prevent deformation of the rings due to load shifting and the like. See FIGS. 28, 29, 30, 32, 33 and 34. According to this embodiment, vertical support posts 300 support the ends of the bag rings 86 in the down position.

Each support post 300 includes a hook 306 at its upper end, and a bottom flange base 308 at its lower end. Each pair of the bag rings 86 is provided with keeper brackets 302 attached at the front and rear portions of a connected pair of bag rings. An open loop guide 304 is attached to the front and rear portions of a corresponding bag platform 32.

Support posts 300 are connected to the bag rings 86 by first lowering the bags part way and stopping them. The hooked ends 306 of posts 300 are inserted upwardly through loop guides 304, and the hooks 306 are inserted into corresponding keeper openings 310 in ring support brackets 302. The bags are then fully lowered, coming to rest with the platform 32 of the floor of the freight vehicle and the ends of the bag rings 86 being supported by support posts 300 extending from ring brackets 302 to the floor of the vehicle. The length of support posts 300 corresponds to the distance between bag rings 86 and the floor of the freight vehicle in the bulk-handling mode (down position). The bottom flange bases 308 are made larger than loop guides 304, so that the flange bases 308 cannot pass through loops 304 during the bulk-handling mode.

Figure 30:
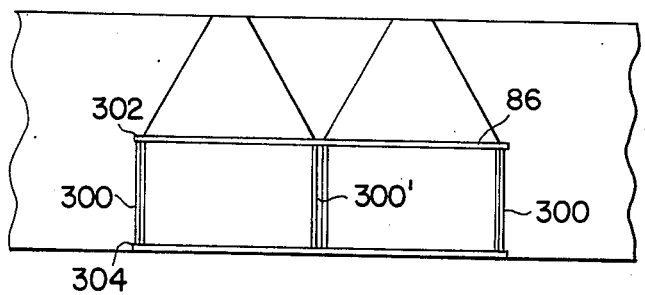
FIG. 30 is a side elevation view, partially schematic, of a pair of bags in the bulk mode with bag ring supports.
Figure 31:
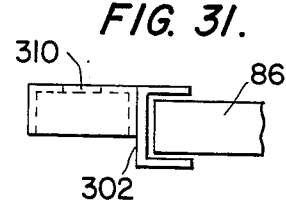
FIG. 31 is a detailed elevational view of a ring support bracket according to one embodiment.
Figure 32:
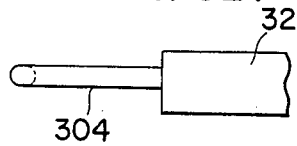
FIG. 32 is a detailed elevational view of a bottom platform loop guide according to one embodiment.
Figure 33:
FIG. 33 is a side elevation view of a ring support post according to one embodiment.
Figure 34:
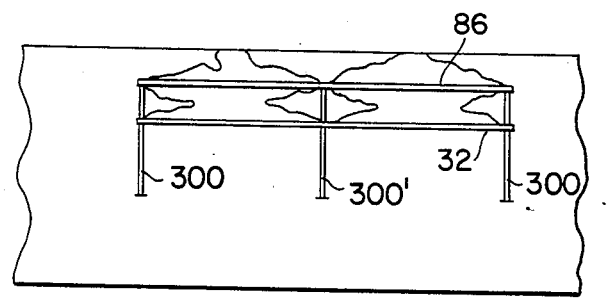
FIG. 34 is a side elevational view of a pair of bags partially lowered for connection of the ring support posts.

According to this embodiment, a central support post 300' may be similarly connected to the central portion of a pair of bag rings 86 for additional support See FIGS. 30 and 34.

Figure 35:
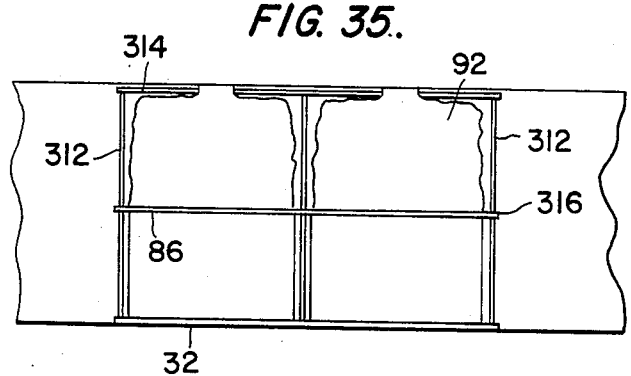
FIG. 35 is a side elevation view, partially schematic, of a pair of bags in the bulk mode according to one embodiment, with support posts in place.

In another embodiment, support posts 312 are provided which extend from an extended horizontal frame support 314 at the top of the freight vehicle to the floor of the freight vehicle. See FIG. 35. Suitable connections between bag rings 86 and support post 312 at 316 prevent deformation of the bag rings in the bulk mode. According to this embodiment, the upper portions 92 of the bags may be of an expanded size with a diameter substantially equal to that portion of bags extending between the bag rings 86 and platform 32, for additional bulk materials storage area.

From the pulley box 40, the four cables 38 lead to a common connector 74 from whence a single cable 76 leads to the winch 36. See FIG. 11.

Suitable means are provided for rigidly connecting the platform 32 to the floor when unloading the bins or anytime the bins are in the bulk mode or down position. See FIGS. 3a, 3b and 3c. In the embodiment shown in FIG. 3a, one such means may include a bolt 140 extending linearly through tubular support member 142 in the platform 32. One end 144 of bolt 140 extends out from support member 142 and into a complementary opening in keeper 148 to lock the support rigidly when in the down position. Keeper 148 may be attached to or a part of support rail 42.

The other end 150 of bolt 140 extends into a discharge spout opening 152 through platform 32. Handle means 146 are provided at end 150 of bolt 140 so that bolt 140 may be inserted and locked into or retracted from keeper 148. Suitable means such as a spring 149 may be operatively connected to bolt 140 to maintain bolt 140 in the locked position during use. Suitable means such as pin 153 may also be used to maintain bolt 140 in a retracted position when the bulk storage bin is not in the bulk-handling mode.

The platform 32 may be further rigidly connected to the floor in the area of discharge spout opening 152 by suitable means such as a hook 157 connected to the platform by ring 151, the hook being selectively engageable with a corresponding eyelet 155 attached to a side of the discharge opening in the floor 18 of the vehicle.

In the embodiment shown in FIG. 3b, bolt 140 is utilized as described above. However, platform 32 is further rigidly connected to the floor in the area of the discharge spout opening 152 by means of a downwardly extending, vertically oriented pin 220 attached to platform 32 and extending into and mating with a complementary opening in floor 18 of the freight vehicle.

In the embodiment shown in FIG. 3c, platform 32 is connected to the floor by means of pins 222 and 224 attached to platform 32 and extending into and mating with complementary openings in floor 18 of the freight vehicle.

A center post 52 on the sidewalls of the cargo space may provide a suitable support for the winch 36 via a connecting cross beam as disclosed in copending application Ser. No. 480,499 now U.S. Pat. No. 4,534,596. As shown in FIG. 1, a plurality of pallets P may be stored in an upright or flat position in the space between the center posts 52 with suitable means (not shown) for preventing the pallets P from shifting into the area of the bulk carrier bags.

As described in copending application Ser. No. 480,499, each of the bulk cargo bags 30 has a generally cup-shaped inner bag wall 78 and a similarly shaped outer bag wall 80. See FIGS. 2 and 7. The inner bag wall 78 is preferably provided with slack just below its top. A vacuum ring 82 is perforated to draw the inner bag wall 78 against outer bag wall 80 after a discharge cycle. The inner and outer wall bags have an outlet 84 therethrough in the bottom. Adjacent the top of the cup-shaped walls, there is a bag retainer ring 86 of rigid material, such as metal, on the outside of each bag, and an inner bag ring 88. These bag rings are clamped together by suitable means (not shown), and roped ends of the inner and outer bag walls 78 and 80 are held between them. A roped end 90 is also on the edge of a flexible bag top covering (enclosing membrane) 92 which extends from the retainer ring 86 to the top of the cargo space where it is held by a ring 94 to inlet tube 164 secured to the top of the cargo space. See FIG. 5.

Figure 18:
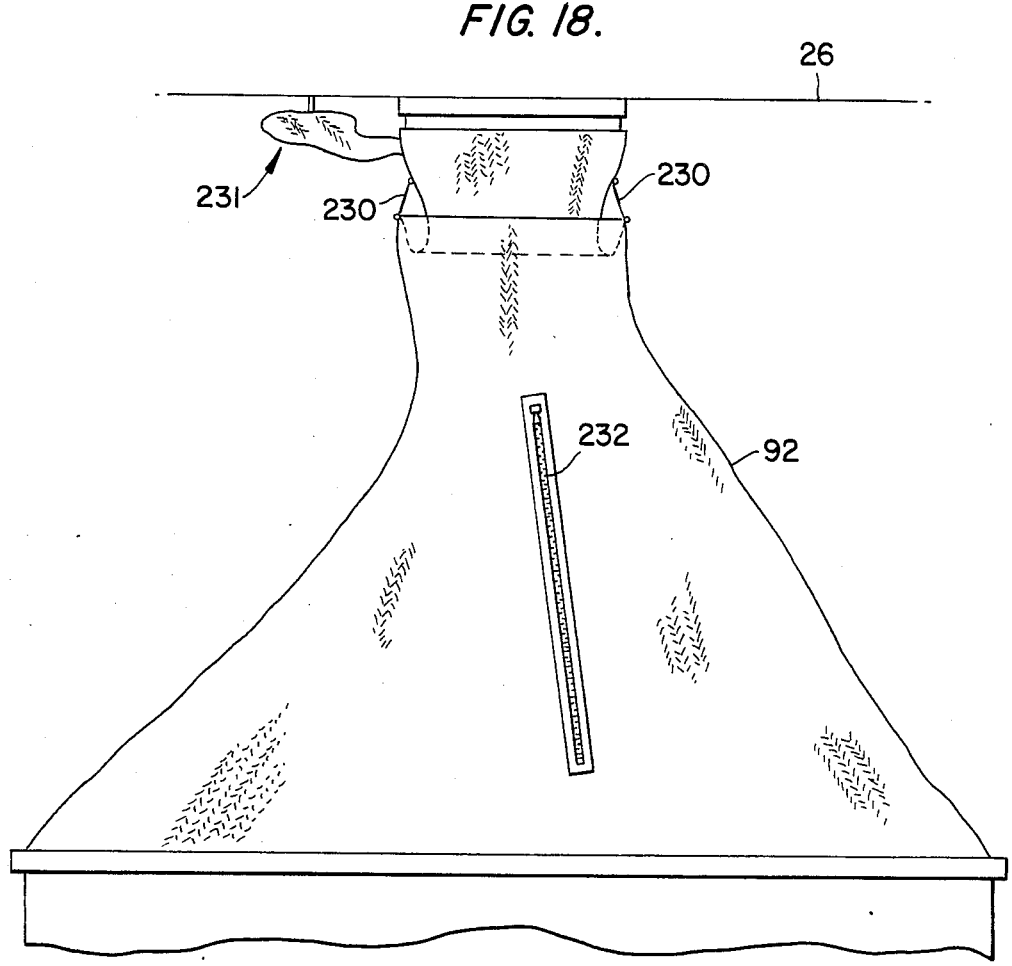
FIG. 18 is an elevational view, partially schematic of the upper portion of a bag according to one embodiment.

Cone-shaped covering 92 may also be provided with means for creating slack near its top. See FIG. 18. The means may include a plurality of resilient bungee cords 230 attached to the cone-shaped covering 92 near its top to create slack. The slack prevents tearing of covering 92.

Figure 5:
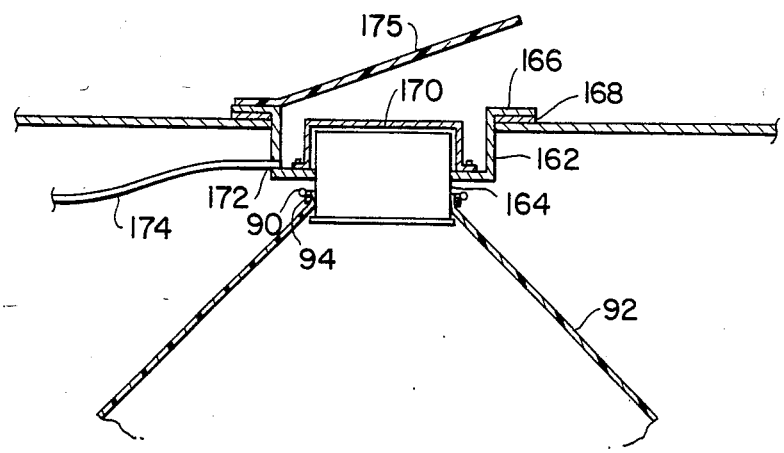
FIG. 5 is a detailed sectional elevation view of a recessed fill opening of a bulk carrier bag.

For trailers having a roof which is at or just below a legal height limit, a recessed or indented fill cap arrangement, such as is illustrated in FIG. 5, may be used. This recessed fill cap arrangement includes an inlet box 162 attached to a rigid inlet tube 164. The inlet box 162 extends through a complementary opening in the trailer roof, and has a peripheral flange 166 which may be attached to the trailer roof by any suitable means such as rivets. A gasket 168 between flange 166 and the trailer roof prevents leakage of water into the trailer. Removable fill cap 170 is complementary to the upper edge of the rigid inlet tube 164, and conventional lock or other suitable means may be utilized to detachably secure the fill cap in place. A drain 172 is provided for the inlet box 162 to drain any water from box 162 through hose 174 to the outside of the trailer. An outer removable flap or cover 175, e.g., of waterproof fabric with a Velcro ® closure or other suitable closure means, may also be provided to further prevent possible leakage, and keep dirt, leaves, ice and snow out of the recessed cap.

With fill caps 170 in place, raising or lowering the bags causes pressure or vacuum to occur respectively within the bags. This may be avoided by providing a breather bag 231 of porous filter material or breathable fabric near the top of covering 92. See FIG. 18. Breather bag 231 allows air to pass between the inside and the outside of a bag, while filtering particulate matter, thereby relieving pressure or vacuum building within a bag which facilitates raising or lowering a bag.

The cone-shaped covering (enclosing membrane) 92 may be provided with a zippered opening 232 for access to the inside of the bag.

Figure 10:
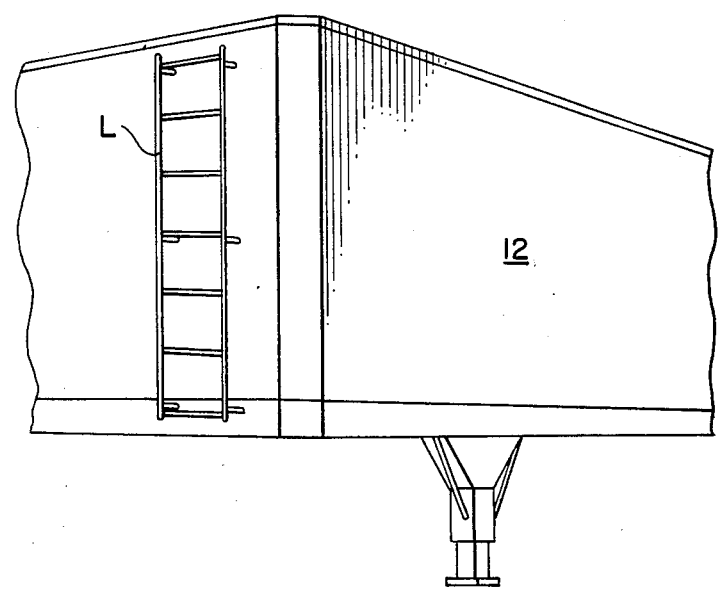
FIG. 10 is a side elevation view showing ladder access to the roof of a trailer according to the invention.

Operator access to the fill inlets and fill caps from the outside may be provided by a ladder L mounted on the outer front wall of the trailer 12 as shown in FIG. 10. As an additional safety measure, the ladder L may be provided with a sliding post (not shown) which is extendable vertically upward from the ladder to provide an operator with a handhold to grasp when climbing onto or down from the roof of the trailer.

It is also desirable to provide longitudinal roof supports (not shown) between the under carriage of the trailer roof and the horizontal bag support structure adjacent the roof to prevent damage to the trailer roof when an operator walks thereon. A strip of non-slip paint may also be provided on the outside of the roof to prevent operator slippage on the roof and indicate where the longitudinal rail supports are located and thus where the operator can step without damaging the trailer roof.

It is highly desirable that as much of the bulk cargo load as possible be supported from the floor of the cargo space, not the sidewalls or the roof.

The details of a bag outlet are described in copending application Ser. No. 480,499 now U.S. Pat No. 4,534,596. An outlet includes an outlet clamp ring 102 clamping the ends of the inner bag wall 78 and outer bag wall 80 as well as an outlet sleeve 104 of flexible extensible material. See FIG. 8.

Additionally, conveyor means such as a screw conveyor (not shown) may be installed beneath the trailer floor and lead from the discharge opening of the bag to the side of the truck or other suitable location.

A plurality of transverse support rods (not shown) of a removable type may be positioned between the rail support plates 48 after the winch raises the platforms 32 so that the platforms rest on the removable rods and do not apply tension to the winch cable. The removable support rods may be supported by J-shaped keepers K attached to top support plates 46. See FIG. 14.

Figure 6:
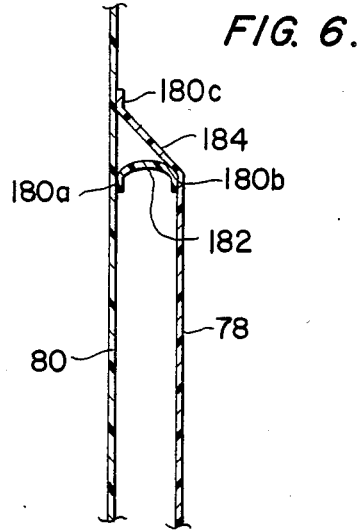
FIG. 6 is a detailed cross-sectional view of sealing means between inner and outer walls of a side-discharge bulk carrier bag.

FIG. 2 shows a modification of this invention wherein the outlet from the bag 30 is at the edge rather than in the center of the bag. As shown in FIG. 2, the bag outlet 130 is adjacent the periphery of the inside of the bag. Sealing means along phantom line 132 seal the inner and outer bag liners together in the area 134 so that when air pressure is applied to the inside of the bag, only the portion removed from the area of the outlet will be first inflated. The sealing means may be heat seals, glue or other adhesive, or other suitable means. The sealing means include three seals 180a, 180b, 180c which seal the inner and outer walls 78 and 80 of the bag. See FIG. 6. Sections 182 and 184 are made up of the bag wall material, and either of the sections 182 and 184 may be a portion of inner wall 78. Section 184 protects seal 180a from stress imposed by the weight of the stored granular material.

In one embodiment, section 182 comprises an upper portion of the inner wall 78 which is rolled over and sealed at 180a to outer wall 80. In this embodiment, section 184 comprises a strip of wall material sealed at 180b and 180c to the inner wall 78 and the outer wall 80, respectively.

In another embodiment, section 184 comprises an upper portion of inner wall 78 which is sealed to outer wall 80 at 180c. In this embodiment, section 182 comprises a strip of folded wall material which is sealed to outer wall 80 and inner wall 78 at 180a and 180b, respectively.

Figure 7:
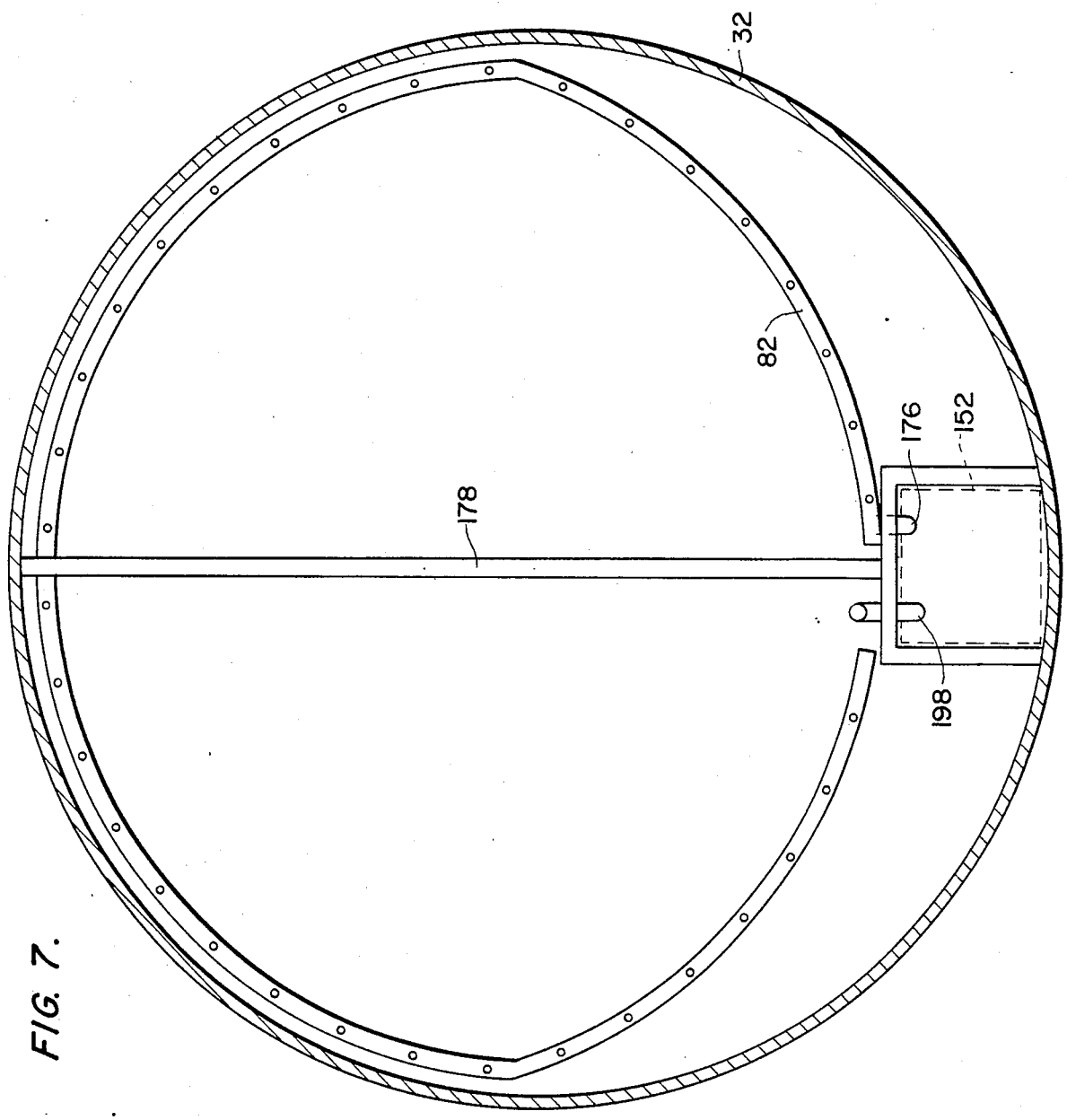
FIG. 7 is a top plan view of a modification of a bag bottom and support platform for side discharge of bulk material.

Additionally, stiffening means, such as one or more flexible battens 178, one of which is shown in FIG. 7, can be secured to the floor portion of the inner membrane, extending from an area close to the discharge spout opening 152 away from the discharge opening to inhibit the inner membrane from wrinkling during the deflation cycle.

In operation, the trailer 12 may be used to haul bulk cargo by having the bags in the position shown in FIG. 1 (the bulk goods mode) as generally described in copending application Ser. No. 480,499 now U.S. Pat. No. 4,534,596. Granular, powder or flake material of varying degrees of flowability or susceptibility to caking, bridging or ratholing, such as sugar, rice, flour, meal, plastic pellets, or the like, may be inserted through the fill openings 96 to fill the bags 30 to an appropriate level with the bag outlets 130 closed. A truck tractor is used to haul the bulk cargo to location and the bulk cargo may then be discharged. Material is discharged from bag 30 to the extent allowed by gravity until its angle of repose is reached or the material stops flowing. Then air from blower 34 is applied by connections (not shown) to the space between bag walls 78 and 80, e.g., via perforated tube 82 causing the top edge of the bag wall to move inwardly to nudge additional material into the discharge cavity and towards the discharge opening.

Alternatively, air may be introduced into perforated tube 82 from an external source (not shown) through airway hose 176 shown in FIG. 7. Airway hose 176 is connected to perforated tube 82, and extends into the discharge spout opening 152 of the platform 32 adjacent to the outlet sleeve 104, see FIGS. 7 and 8. The fluid-assisted gravity discharge action is described in detail in U.S. Pat. No. 4,421,250, granted Dec. 20, 1983.

Figure 8:
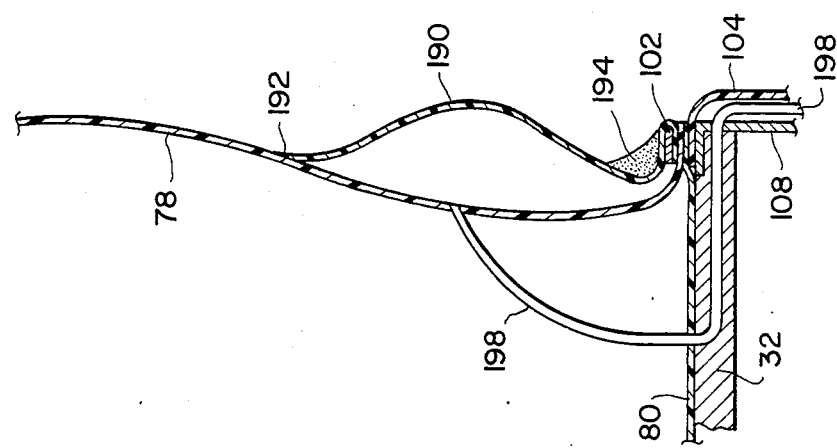
FIG. 8 is a detailed sectional elevation view of a modification of a side discharge bulk carrier bag and a portion of a bottom discharge opening.

Also within the scope of this invention is utilization of a secondary liner as disclosed in commonly owned, copending U.S. patent application Ser. No. 500,821, filed June 3, 1983, now U.S. Pat. No. 4,574,984. As shown in FIG. 8, secondary liner 190 is attached on the inside of inner wall 78 by any suitable means, such as a heat seal liner 190. The secondary liner 192 is connected to platform 32 by clamp ring 102, with clamp ring 102 lying between the secondary liner 190 and inner wall 78. Bulk material 194 remaining in the bin after inflation of inner wall 78, may be nudged towards the discharge opening by air introduced between secondary liner 190 and inner wall 78. Air may be introduced between the secondary liner 190 and inner wall 78 by connections (not shown) to blower 34, or by connection to an external source of air pressure (not shown) via secondary airway tube 198, see FIGS. 7 and 8. Secondary airway tube 198 extends through platform 32 into outlet box 108 adjacent to outlet sleeve 104.

Figure 27:
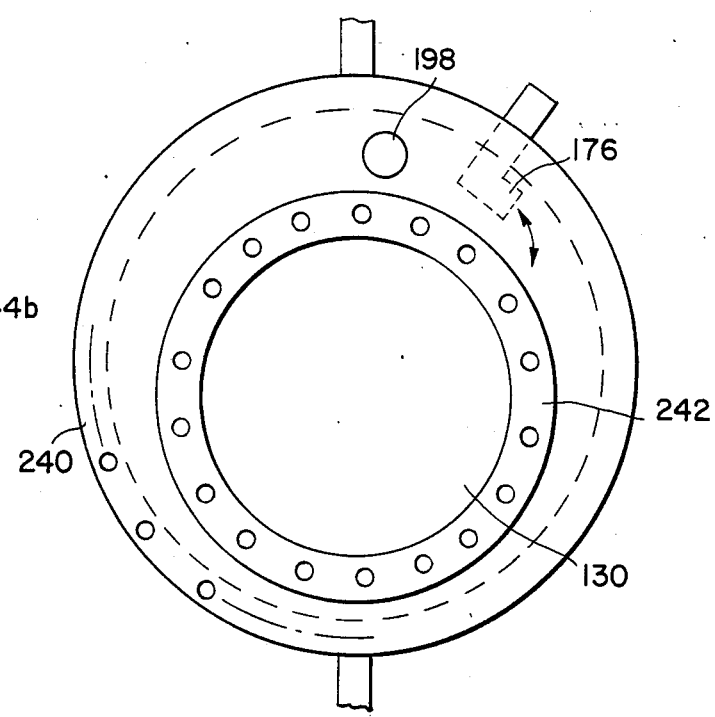
FIG. 27 is a detailed elevational view of a platform discharge opening according to one embodiment.
Figure 28:
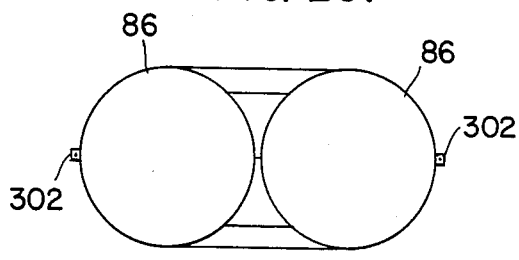
FIG. 28 is a top plan view of a modification of a pair of bag support rings.
Figure 29:
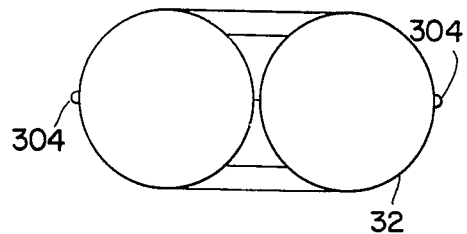
FIG. 29 is a top plan view of a modification of a support platform.

The underside of a platform discharge opening assembly which is suitable for use with a bag having a secondary liner 190 is shown in FIG. 27. Outer bag wall 80 and primary membrane 78 are secured about the discharge opening 130 by a clamping ring at the outer periphery 240 of the discharge opening assembly. Secondary liner 190 is secured about discharge opening 130 by a clamping ring at the inner periphery 242 of the discharge opening assembly. Airway 176 is connected to perforated tube 82 for inflation of primary membrane 78 by hookups with an external source of air (not shown). Air is introduced between secondary liner 190 and inner wall 78 from an external source (not shown) through airway connector 198.

After completely discharging the bulk cargo by gravity assist, the inner wall 78 is brought back to its original position by applying vacuum to the perforated tube 82. This can also be conveniently applied via suction from blower 34 or by other suitable sources of vacuum. Vacuum may also be applied from an external source (not shown) via airway hose 176. As the inner wall 78 is deflated and returned to its original position, the secondary liner 190 is pulled taut which will force inflating air out through airway tube 198. Alternatively, secondary liner 190 may be returned to its original position by suction applied via airway tube 198 using suitable means. If desired, the other features such as automatic controls either on the vehicle or at an unloading station may also be utilized within the general scope of this invention.

If the next trip of the trailer 12 is for hauling piece goods, such as bags or boxes loaded on pallets, the winch 36 is activated to cause the cables 38 and 76 to raise the platforms 32 to a position adjacent trailer roof 26 and then the transverse rods are placed under the platform in keeper K to hold the platform in the raised position, as described in U.S. Pat. No. 4,534,596.

As can be seen, this invention can be applied to existing semi-trailers. For converting an existing trailer, all that need be done is provide openings in the floor and ceiling for the fill and discharge and then apply the inexpensive lightweight components of this invention. Such components may be supplied in kit form.

Although a preferred embodiment has been illustrated, it is apparent to those with skill in the art that it may be varied within the scope of the invention. For example, discharge or loading could be through the side of the vehicle; the bag support platform could be formed without a discharge opening if there were a side discharge.

This invention provides tremendous advantages in converting a cargo space for piece goods selectively into cargo space for bulk goods without the large heavy hoppers conventionally used and thus with less weight which is saving of energy as well as construction and manufacturing costs.

What is claimed is:

1. A freight vehicle having a cargo space convertible from a piece goods handling mode with a space suitable for piece goods to a bulk goods handling mode with space suitable for bulk material, the vehicle being of the type including means defining a cargo space having a bottom load-bearing floor, side and end walls, and a roof, and door means providing access to the cargo space for loading and unloading piece goods cargo therein, characterized by means defining a discharge opening in the vehicle for emptying bulk material cargo from the cargo space, means defining a fill opening in the vehicle, an inflatable double-walled generally cup-shaped bag having an inner and an outer wall for containing bulk cargo, the bag having an outlet opening positionable to register with the discharge opening in the vehicle, means for connecting the fill opening to the top edge wall of the bag, inlet means for inflation and deflation of the bag, the inflation causing expansion of the inner bag wall to assist in gravity discharge of the material after its angle of repose is reached or the material stops flowing, a rigid bag bottom support platform supporting the bag bottom and removably secured to the floor when the cargo space is used in a bulk material handling mode, mechanical means for maintaining the bag in an erected position when the bag support platform is on the floor and the cargo space is in the bulk-handling mode, hoisting means for raising the bag bottom support platform from the floor of the cargo space to an upper position with the bag support platform adjacent to the roof of the cargo space with the bag collapsed to convert the cargo space to space suitable for piece goods handling, and supplemental discharge means for discharging material remaining in the bag following full inflation of the bag, the supplemental discharge means including a supplemental inflatable flexible membrane connected to the support platform at the bag outlet and attached to the inner surface of the inner bag wall, the supplemental membrane having a supplemental inlet for inflation thereof.

2. A freight vehicle having a cargo space convertible from a piece goods handling mode with a space suitable for piece goods to a bulk goods handling mode with space suitable for bulk material, the vehicle being of the type including means defining a cargo space having a bottom load-bearing floor, side and end walls, and a roof, door means providing access to the cargo space for loading and unloading piece goods cargo therein, characterized by means defining a discharge opening in the vehicle for emptying bulk material cargo from the cargo space, means defining a fill opening in the vehicle, an inflatable double-walled generally cup-shaped bag having an inner and an outer wall for containing bulk cargo, the bag having an outlet opening positionable to register with the discharge opening in the vehicle, means for connecting the fill opening to the top edge wall of the bag, inlet means for inflation and deflation of the bag, the inflation causing expansion of the inner bag wall to assist in gravity discharge of the material after its angle of repose is reached or the material stops flowing, a rigid bag bottom support platform supporting the bag bottom and removably secured to the floor when the cargo space is used in a bulk material handling mode, mechanical means for maintaining the bag in an erected position when the bag support platform is on the floor and the cargo space is in bulk-handling mode, and hoisting means for raising the bag bottom support platform from the floor of the cargo space to an upper position with the bag support platform adjacent to the roof of the cargo space with the bag collapsed to convert the cargo space to space suitable for piece goods handling, wherein the means for connecting the fill opening to the top edge wall of the cup-shaped bag comprises an enclosing membrane for enclosing an area extending from the fill opening in the vehicle to the top of the bag, and means for allowing slack in the enclosing membrane near the top of the enclosing member.

3. The freight vehicle of claim 2 wherein the means for allowing slack in the enclosing membrane includes a plurality of flexible bungee cords attached to the enclosing membrane.

4. A freight vehicle having a cargo space convertible from a piece goods handling mode with a space suitable for piece goods to a bulk goods handling mode with space suitable for bulk material, the vehicle being of the type including means defining a cargo space having a bottom load-bearing floor, side and end walls, and a roof, and door means providing access to the cargo space for loading and unloading piece goods cargo therein, characterized by means defining a discharge opening in the vehicle for emptying bulk material cargo from the cargo space, means defining a fill opening in the vehicle, an inflatable double-walled generally cup-shaped bag having an inner and an outer wall for containing bulk cargo, the bag having an outlet opening positionable to register with the discharge opening in the vehicle, means for connecting the fill opening to the top edge wall of the bag, inlet means for inflation and deflation of the bag, the inflation causing expansion of the inner bag wall to assist in gravity discharge of the material after its angle of repose is reached or the material stops flowing, a rigid bag bottom support platform supporting the bag bottom and removably secured to the floor when the cargo space is used in a bulk material handling mode, mechanical means for maintaining the bag in an erected position when the bag support platform is on the floor and the cargo space is in bulk-handling mode, and hoisting means for raising the bag bottom support platform from the floor of the cargo space to an upper position with the bag support platform adjacent to the roof of the cargo space with the bag collapsed to convert the cargo space to space suitable for piece goods handling, wherein the means for connecting the fill opening to the top edge wall of the bag comprises an enclosing membrane for enclosing an area extending from the fill opening in the vehicle to the top of the bag, and means for permitting the passage of gas between the inside and outside of the bag and for filtering air-born particulate matter during raising and lowering of the bag.

5. The freight vehicle of claim 4 wherein the gas-passage means includes a porous filter material which is impermeable to particulate matter.

6. A freight vehicle having a cargo space convertible from a piece goods handling mode with a space suitable for piece goods to a bulk goods handling mode with space suitable for bulk material, the vehicle being of the type including means defining a cargo space having a bottom load-bearing floor, side and end walls, and a roof, and door means providing access to the cargo space for loading and unloading piece goods cargo therein, characterized by means defining a discharge opening in the vehicle for emptying bulk material cargo from the cargo space, means defining a fill opening in the vehicle, an inflatable double-walled generally cup-shaped bag having an inner and an outer wall for containing bulk cargo, the bag having an outlet opening positionable to register with the discharge opening in the vehicle, means for connecting the fill opening to the top edge wall of the bag, inlet means for inflation and deflation of the bag, the inflation causing expansion of the inner bag wall to assist in gravity discharge of the material after its angle of repose is reached or the material stops flowing, a rigid bag bottom support platform supporting the bag bottom and removably secured to the floor when the cargo space is used in a bulk material handing mode, mechanical means for maintaining the bag in an erected position when the bag support platform is on the floor and the cargo space is in bulk-handling mode, and hoisting means for raising the bag bottom support platform from the floor of the cargo space to an upper position with the bag support platform adjacent to the roof of the cargo space with the bag collapsed to convert the cargo space to space suitable for piece goods handling, wherein the means for connecting the fill opening to the top edge wall of the bag comprises an enclosing membrane for enclosing an area extending from the fill opening in the vehicle to the top of the bag, the enclosing membrane having selectively closable access means located between the fill opening and the top of the bag for gaining access to the inside of the cup-shaped bag.

7. The freight vehicle of claim 6 wherein the access-gaining means includes a zippered opening in the enclosing membrane.

8. A freight vehicle having a cargo space convertible from a piece goods handling mode with a space suitable for piece goods to a bulk goods handling mode with space suitable for bulk material, the vehicle being of the type including means defining a cargo space having a bottom load-bearing floor, side and end walls, and a roof, and door means providing access to the cargo space for loading and unloading piece goods cargo therein, characterized by means defining a pair of inflatable double-walled generally cup-shaped bags, each having an inner and an outer wall for containing bulk cargo, a discharge opening in the vehicle for each bag for emptying bulk material cargo from the cargo space, each bag having an outlet opening positionable to register with a corresponding discharge opening in the vehicle, a fill opening in the vehicle for each bag, means for connecting a fill opening to the top edge wall of a corresponding bag, inlet means for inflation and deflation of each of the bags, the inflation causing expansion of the inner bag wall to assist in gravity discharge of the material after its angle of repose is reached or the material stops flowing, a rigid bag bottom support platform supporting the bottoms of both bags and removably secured to the floor when the cargo space is used in a bulk material handling mode, mechanical means for maintaining the bags in an erected position when the bag support platform is on the floor and the cargo space in bulk handling mode, and hoisting means for raising the bag bottom support platform from the floor of the cargo space to an upper position with the bag support platform adjacent to the roof of the cargo space with the bags collapsed to convert the cargo space to space suitable for piece goods handling, wherein the mechanical means includes a rigid annular ring around the top of the outer wall of each cup-shaped bag, means for rigidly connecting the annular rings to each other, side supports connected to the sidewalls of the cargo space, guide means for guiding the connected annular rings along the side supports during raising and lowering the bags, tab means extending from the annular rings which cooperate with connecting means on the sidewall of the cargo space to prevent shifting of the annular rings, and means for supporting front and rear portions of the connected annular rings.

9. The freight vehicle of claim 8 wherein the front and rear ring support means include a removable front support post and a removable rear support post, each post extending from an annular ring to the floor of the freight vehicle in the bulk-handling mode, and means for supportably connecting the front and rear portions of the connected annular rings to the corresponding support posts.

10. The freight vehicle of claim 9 further including a removable central ring support post extending from the means for rigidly connecting the annular rings to the floor of the cargo space, and means for supportably connecting the annular rings to the central support post.

11. The freight vehicle of claim 8 wherein the front and rear ring support means include a removable front support crossbar and a removable rear support crossbar, each crossbar detachably connected to the cargo space sidewalls extending from one sidewall to the other, and means for supportably connecting the front and rear portions of the connected annular rings to the corresponding crossbars.

12. A freight vehicle having a cargo space convertible from a piece goods handling mode with a space suitable for piece goods to a bulk goods handling mode with space suitable for bulk material, the vehicle being of the type including means defining a cargo space having a bottom load-bearing floor, side and end walls, and a roof, and door means providing access to the cargo space for loading and unloading piece goods cargo therein, characterized by means defining a discharge opening in the vehicle for emptying bulk material cargo from the cargo space, means defining a fill opening in the vehicle, an inflatable double-walled generally cup-shaped bag having an inner and an outer wall for containing bulk cargo, the bag having an outlet opening positionable to register with the discharge opening in the vehicle, means for connecting the fill opening to the top edge wall of the bag, inlet means for inflation and deflation of the bag, the inflation causing expansion of the inner bag wall to assist in gravity discharge of the material after its angle of repose is reached or the material stops flowing, a rigid bag bottom support platform supporting the bag bottom, mechanical means for maintaining the bag in an erected position when the bag support platform is on the floor and the cargo space is in the bulk-handling mode, hoisting means for raising the bag bottom support platform from the floor of the cargo space to an upper position with the bag support platform adjacent to the roof of the cargo space with the bag collapsed to convert the cargo space to space suitable for piece goods handling, and means for removably securing the support platform to the floor in the bulk-handling mode, the securing means including a slidable platform bolt cooperating with a keeper connected to the trailer sidewall, and a platform hook cooperating with an eyelet connected to the trailer floor.

13. A freight vehicle having a cargo space convertible from a piece goods handling mode with a space suitable for piece goods to a bulk goods handling mode with space suitable for bulk material, the vehicle being of the type including means defining a cargo space having a bottom load-bearing floor, side and end walls, and a roof, and door means providing access to the cargo space for loading and unloading piece goods cargo therein, characterized by means defining a discharge opening in the vehicle for emptying bulk material cargo from the cargo space, means defining a fill opening in the vehicle, an inflatable double-walled generally cup-shaped bag having an inner and an outer wall for containing bulk cargo, the bag having an outlet opening positionable to register with the discharge opening in the vehicle, means for connecting the fill opening to the top edge wall of the bag, inlet means for inflation and deflation of the bag, the inflation causing expansion of the inner bag wall to assist in gravity discharge of the material after its angle of repose is reached or the material stops flowing, a rigid bag bottom support platform supporting the bag bottom, mechanical means for maintaining the bag in an erected position when the bag support platform is on the floor and the cargo space is in the bulk handling mode, hoisting means for raising the bag bottom support platform from the floor of the cargo space to an upper position with the bag support platform adjacent to the roof of the cargo space with the bag collapsed to convert the cargo space to space suitable for piece goods handling, and means for securing the support platform to the floor in the bulk-handling mode, the securing means including a slidable platform bolt cooperating with a keeper connected to the trailer sidewall, and a downwardly projecting, vertically oriented pin attached to the bottom of the platform and cooperating with a complementary opening in the floor of the cargo space.

14. A freight vehicle having a cargo space convertible from a piece goods handling mode with a space suitable for piece goods to a bulk goods handling mode with space suitable for bulk material, the vehicle being of the type including means defining a cargo space having a bottom load-bearing floor, side and end walls, and a roof, and door means providing access to the cargo space for loading and unloading piece goods cargo therein, characterized by means defining a discharge opening in the vehicle for emptying bulk material cargo from the cargo space, means defining a fill opening in the vehicle, an inflatable double-walled generally cup-shaped bag having an inner and an outer wall for containing bulk cargo, the bag having an outlet opening positionable to register with the discharge opening in the vehicle, means for connecting the fill opening to the top edge wall of the bag, inlet means for inflation and deflation of the bag, the inflation causing expansion of the inner bag wall to assist in gravity discharge of the material after its angle of repose is reached or the material stops flowing, a rigid bag bottom support platform supporting the bag bottom, mechanical means for maintaining the bag in an erected position when the bag support platform is on the floor and the cargo space is in the bulk-handling mode, hoisting means for raising the bag bottom support platform from the floor of the cargo space to an upper position with the bag support platform adjacent to the roof of the cargo space with the bag collapsed to convert the cargo space to space suitable for piece goods handling, and a downwardly projecting, vertically oriented pin extending from the bottom of the platform to cooperate with a complementary opening in the floor of the cargo space.

15. A freight vehicle having a cargo space convertible from a piece goods handling mode with a space suitable for piece goods to a bulk goods handling mode with space suitable for bulk material, the vehicle being of the type including means defining a cargo space having a bottom load-bearing floor, side and end walls, and a roof, and door means providing access to the cargo space for loading and unloading piece goods cargo therein, characterized by means defining a discharge opening in the vehicle for emptying bulk material cargo from the cargo space, means defining a fill opening in the vehicle, an inflatable double-walled generally cup-shaped bag having an inner and an outer wall for containing bulk cargo, the bag having an outlet opening positionable to register with the discharge opening in the vehicle, an enclosing membrane for connecting the fill opening to the top edge wall of the bag, the enclosing membrane being connect to the fill opening and enclosing an area extending from the fill opening to the top of the bag, inlet means for inflation and deflation of the bag, the inflation causing expansion of the inner bag wall to assist in gravity discharge of the material after its angle of repose is reached or the material stops flowing, a rigid bag bottom support platform supporting the bag bottom and removably secured to the floor when the cargo space is used in a bulk material handling mode, mechanical means for maintaining the bag in an erected position when the bag support platform is on the floor and the cargo space is in bulk-handling mode, and hoisting means for raising the bag bottom support platform from the floor of the cargo space to an upper position with the bag support platform adjacent to the roof of the cargo space with the bag collapsed to convert the cargo space to space suitable for piece goods handling, wherein means connecting the fill opening in the vehicle with the enclosing membrane are recessed into the cargo space from the vehicle roof.

16. A freight vehicle having a cargo space convertible from a piece goods handling mode with a space suitable for piece goods to a bulk goods handling mode with space suitable for bulk material, the vehicle being of the type including means defining a cargo space having a bottom load-bearing floor, side and end walls, and a roof, and door means providing access to the cargo space for loading and unloading piece goods cargo therein, characterized by means defining a discharge opening in the vehicle for emptying bulk material cargo from the cargo space, means defining a fill opening in the vehicle, an inflatable double-walled generally cup-shaped bag having an inner and an outer wall for containing bulk cargo, the bag having an outlet opening positionable to register with the discharge opening in the vehicle, means for connecting the fill opening to the top edge wall of the bag, inlet means for inflation and deflation of the bag, the inflation causing expansion of the inner bag wall to assist in gravity discharge of the material after its angle of repose is reached or the material stops flowing, a rigid bag bottom support platform supporting the bag bottom and removably secured to the floor when the cargo space is used in a bulk material handling mode, mechanical means for maintaining the bag in an erected position when the bag support platform is on the floor and the cargo space is in bulk-handling mode, hoisting means for raising the bag bottom support platform from the floor of the cargo space to an upper position with the bag support platform adjacent to the roof of the cargo space with bag collapsed to convert the cargo space to space suitable for piece goods handling, the hoisting means including a horizontal hoisting support member adjacent the roof of the cargo space and a plurality of vertical support members connected to the sidewalls of the cargo space, the vertical support members being flexible connected to the horizontal support member.

17. A freight vehicle having a cargo space convertible from a piece goods handling mode with a space suitable for piece goods to a bulk goods handling mode with space suitable for bulk material, the vehicle being of the type including means defining a cargo space having a bottom load-bearing floor, side and end walls, and a roof, and door means providing access to the cargo space for loading and unloading piece goods cargo therein, characterized by means defining a discharge opening in the vehicle for emptying bulk material cargo from the cargo space, means defining a fill opening in the vehicle, an inflatable double-walled generally cup-shaped bag having an inner and an outer wall for containing bulk cargo, the bag having an outlet opening positionable to register with the discharge opening in the vehicle, means for connecting the fill opening to the top edge wall of the bag, inlet means for inflation and deflation of the bag, the inflation causing expansion of the inner bag wall to assist in gravity discharge of the material after its angle of repose is reached or the material stops flowing, means for allowing slack in the inner bag wall near the top of the inner bag wall, a rigid bag bottom support platform supporting the bag bottom and removably secured to the floor when the cargo space is used in a bulk material handling mode, mechanical means for maintaining the bag in an erected position when the bag support platform is on the floor and the cargo space in is bulk-handling mode, hoisting means for raising the bag bottom support platform from the floor of the cargo space to an upper position with the bag support platform adjacent to the roof of the cargo space with the bag collapsed to convert the cargo space to space suitable for piece goods handling.

* * * * *